United States Patent [19]

Buchanan

[11] 4,262,831

[45] Apr. 21, 1981

[54] TRAFFIC CONE RACK FOR MOUNTING ON A VEHICLE

[76] Inventor: William I. Buchanan, 2619 Princeton, San Angelo, Tex. 76901

[21] Appl. No.: 923,492

[22] Filed: Jul. 11, 1978

[51] Int. Cl.³ .................................................. B60R 11/00
[52] U.S. Cl. ............................. 224/42.45 R; 211/59.1; 248/309 A; 403/149
[58] Field of Search ................ 224/42.45 R, 42.46 R, 224/42.43, 42.44, 29 R, 42.03 R, 39 R, 33 R, 32 A, 37, 32 R, 30 R; 211/54.1, 57.1, 59.1, 99, 30, 31, 32, 16, 490; 16/125, 126; 248/291, 311.1 R, 309 A, 145.3, 309 R, 311.1 A, 313, 316 R; 403/120, 145, 149

[56] References Cited

U.S. PATENT DOCUMENTS

| 736,806 | 8/1903 | White | 211/32 |
|---|---|---|---|
| 790,689 | 5/1905 | Judkins | 16/126 |
| 2,164,514 | 7/1939 | Goldstein | 211/54.1 X |
| 2,452,689 | 11/1948 | Sheppard | 248/291 X |
| 3,184,101 | 5/1965 | Pentesco | 16/125 X |
| 3,194,529 | 7/1965 | Brock | 248/313 |
| 3,386,589 | 6/1968 | Prete | 248/291 X |
| 4,054,256 | 10/1977 | Buck et al. | 248/291 X |

FOREIGN PATENT DOCUMENTS

| 237952 | 1/1911 | Fed. Rep. of Germany | 248/311.1 A |
| 1087339 | 2/1955 | France | 224/42.45 R |

Primary Examiner—Robert J. Spar
Assistant Examiner—Jerold M. Forsberg
Attorney, Agent, or Firm—Gunn, Lee & Jackson

[57] ABSTRACT

A traffic cone rack adapted to be mounted on a bumper, a floor or side panel of a vehicle. The device includes an elongated body portion adapted for securing to a portion of a vehicle. A cone support bail projects outward from the body for receiving traffic cones. A cone locking bail is tiltably secured to the body and moves over a fulcrum point for locking the traffic cones on the bail in a carrying position. An adjunct to the device is a warning buzzer which sounds when the locking bail is in the open position and the ignition switch of the vehicle is on.

5 Claims, 4 Drawing Figures

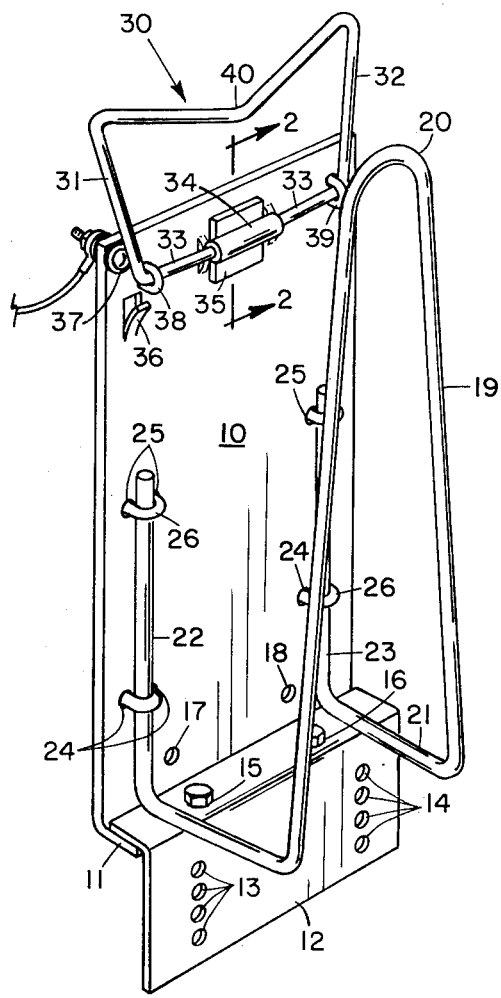
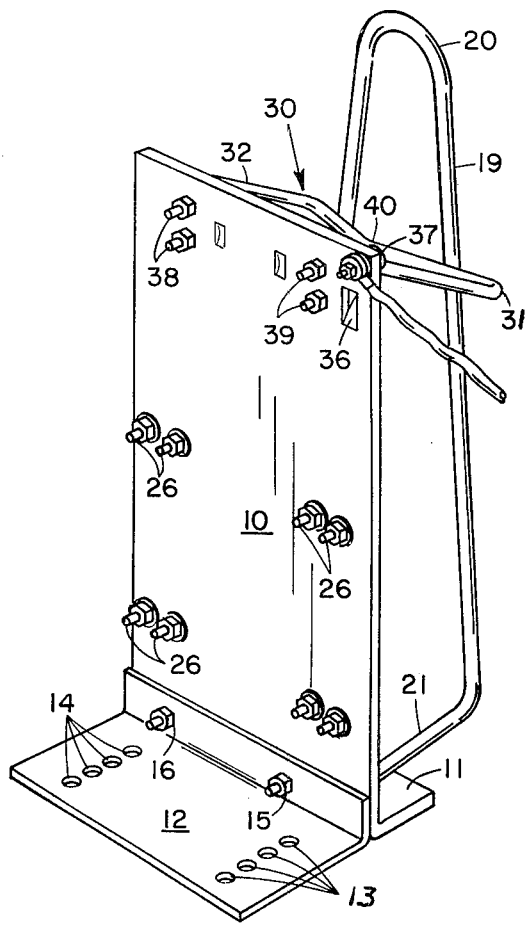
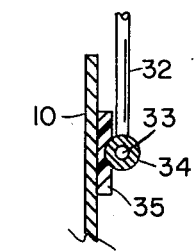
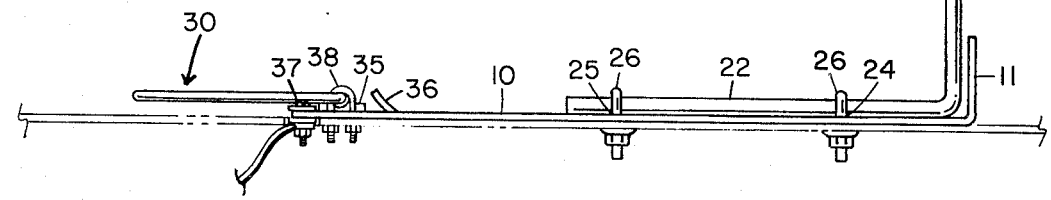
FIG. 1
FIG. 2
FIG. 3
FIG. 4

TRAFFIC CONE RACK FOR MOUNTING ON A VEHICLE

BACKGROUND OF THE INVENTION

1. Field of the Invention

This invention pertains to a carrying rack for mounting on a vehicle to which is removably secured traffic cones for transporting from location to location. This invention generally comprises a traffic cone rack which may be secured to the bumper, floor or body panel of the vehicle for convenience in receiving and retaining rubber or plastic traffic cones.

2. Prior Art

Traffic cones are usually transported in a nesting position stacked and loaded into the cargo space of a vehicle or nestled in boxes or loading compartments. An improvement over the prior art accomplished by the device of this invention is the neat and orderly configuration and appearance not cluttering the vehicle. The device possesses an additional advantage of warning the driver of the vehicle when the ignition switch is activated and the cone locking bail is not in the secured or closed position.

SUMMARY OF THE INVENTION

The device of this invention generally comprises an elongated metal body constructed from sheet metal utilizing a press break for forming. A cone support bail, constructed from zinc plated steel rod, is formed utilizing a tube and rod bender. The cone support bail is secured to the elongated body portion with "U" bolts. The elongated body portion is constructed with a body end projection to facilitate securing of the device to the body, bumper, floor or deck of a vehicle. For flexibility in mounting as an adjunct to the elongated body and end projection there is provided an adapter plate which, in conjunction with the body end projection, forms various configurations for securing the device to a bumper as well as the floor or deck of a vehicle. The traffic cones or pylons may be placed stacked on the cone support bail for transporting. Mounted also on the body of the device is a spring loaded tiltable cone locking bail. In the closed position, this cone locking bail secures the traffic cones and retains them on the cone support bail for transporting. In association with the cone locking bail, there is constructed in the device a warning contact which is wired in series with a buzzer to the ignition switch of the vehicle. If the bail of the device is in the open position and the ignition switch of the vehicle is activated, the grounding of the circuit through the cone locking bail contacting the warning contact causes the buzzer to sound alerting the driver to the fact that the cones are not secured. This audible warning not only prevents loss of the traffic cones, but alerts the driver of the required safety walk around the vehicle prior to departure from the parked position.

Several methods of construction for the device of this invention might be employed. However, the preferred embodiment was constructed from zinc plated cold rolled steel materials utilizing a press break for working and forming the sheet metal with a tube and rod bender utilized for working the rod portions comprising the cone support bail and the cone locking bail. The numerous holes in the body portion might be formed with a drill press, or punch techniques may be employed.

BRIEF DESCRIPTION OF THE DRAWINGS

For an illustration of the construction, assembly and utilization of the preferred embodiment, reference is made to the attached several drawings wherein identical reference characters will be utilized to refer to identical or equivalent components throughout the several views and the following detailed description of the preferred embodiment.

FIG. 1 is a front perspective view of the device simulating its utilization mounted on the bumper of a vehicle.

FIG. 2 is a fragmented, sectional view taken substantially on line 2—2 of FIG. 1 looking in the direction of the arrows illustrating some of the details of the construction of the spring fulcrum loading of the cone locking bail.

FIG. 3 is a rear perspective view illustrating the device mounted on a floor or deck utilizing the body end projection and the adapter plate.

FIG. 4 is a side view of the device depicting a body secured to a wall panel or floor of a vehicle avoiding the use of the adapter plate.

DESCRIPTION OF THE PREFERRED EMBODIMENT

The device of this invention might be constructed from various type materials; however, in the preferred embodiment, the elongated body 10 was constructed from $\frac{1}{8}$" zinc plated cold rolled steel sheet cut 6" wide and $13\frac{3}{4}$" long. The elongated body was held in a press break and a right angle bend $1\frac{3}{4}$" long formed in one end. This projection at one end of the body portion 10 forms body end projection 11. The purpose of this projection is to facilitate the mounting of the device on a vehicle. An adapter plate 12 was constructed from 1/16" zinc plated steel sheet 6" wide and $4\frac{3}{4}$" long which was also formed with a $1\frac{3}{4}$" long right angle bend which was compatible with body end projection 11. The compatible interfunctioning of body end projection 11 and adapter plate 12 facilitates the mounting of the device on the bumper of a vehicle as illustrated in FIG. 1. A mounting on the floor or deck of a vehicle is illustrated in FIG. 3. For added flexibility, adapter plate 12 is formed with a series of first row mounting holes 13 which are $\frac{1}{2}$" apart and a corresponding second row mounting holes 14 having identical configuration and spacing. As illustrated in FIGS. 1 and 3, to facilitate the securing of these structures to a bumper or deck of a vehicle, first adpater plate hole 15 and second adapter plate hole 16 were formed in the adapter plate $\frac{7}{8}$" from the point of bend. The holes are formed in the $1\frac{3}{4}$" end portion. In a compatible fashion, there was formed in the body end projection 11 of the body 10 a first body mounting hole 17 and a second body mounting hole 18. The size and spacing of these body mounting holes 17 and 18 are compatible with the adapter plate holes 15 and 16. The cone support bail 19 is constructed from 5/16" zinc plated steel rod formed substantially in the configuration illustrated in FIGS. 1 and 2. The cone support bail 19 is 16" long and is formed with an apex 20 which comprises $2\frac{1}{2}$" arcuate bend. The bottom portion of cone support bail generally is formed by a series of bends in the steel rod. Base 21 of cone support bail 19 is $4\frac{1}{2}$" at its base. Projecting upward from base 21 is first bail arm 22 and second bail arm 23 which are $6\frac{1}{2}$" long and project in the direction of the apex 20 of cone support bail 19. These bail arms 22 and 23 are securely attached to body 10 through lower bail arm "U" bolt holes 24 and upper bail arm "U" bolt holes 25. The lower holes 24 are 2½" from the end projection 11 and the upper holes 25 are 6¼" from the end projection 11. The 3/16" "U" bolts 26 which are 1" long were employed in the preferred embodiment for securing the cone support bail 19 to body 10, generally in the configuration as illustrated in FIGS. 1 and 3. The method of securing these "U" bolts 26 is perhaps best illustrated in FIG. 3. At the upper end of the elongated body 10, as illustrated in FIGS. 1 and 3, is secured a cone locking bail 30. This cone locking bail 30 is constructed of 3/16" spring steel rod in the configuration substantially as illustrated in FIGS. 1 and 3. This cone locking bail 30 comprises a first arm 31 and a second arm 32, each of which is approximately 4" long and project outward at approximately a 15° angle from the 5" base 33. The construction and arrangement of the components of cone locking bail 30 are perhaps best illustrated in FIG. 1 with the detail construction illustrated in the fragmented view of FIG. 2. In the center section of base 33 there is mounted a connecting collar 34 which is 1½" long and 5/16" in diameter. Base 33 is constructed with a slight downward deflection at its center. The deflection in base 33 projects toward plastic tension plate 35 as cone locking bail 30 is rotated away from the body 10. The connecting collar 34 works in conjunction with plastic tension plate 35 which is 1" long and ¾" wide as perhaps best illustrated in FIG. 2. With the cone locking bail 30 in the open position for receiving the traffic cones or pylons on the cone support ball 19, as suggested in FIG. 1, cone locking bail 30 is in the up position. In this open or up position, first arm 31 of cone locking bail 30 touches warning contact 37. If cone locking bail 30 is in the down position locking the traffic cones in position on the cone support bail 19, first arm 31 of cone locking bail 30 would contact bail stop 36 retaining the cone locking bail 30 at an angle projecting out from body 10 to hold and lock traffic cones in position on cone support bail 19. Cone locking bail 30 is held in a flexible, tiltable moving position on the elongated body 10 of the device by means of cone locking bail first "U" bolt 38 at one end and cone locking bail second "U" bolt 39 at the opposite end. In forming the cone locking bail 30, it is preferable for the interconnecting section between the first arm 31 and second arm 32 to be formed with a cone locking "V" 40 which has an approximate 2½" indentation in its center section. This configuration facilitates the grasping and retention of the traffic cones on cone support bail 19 when the cone locking bail 30 is in the down or locked position.

OPERATION OF THE DEVICE

The general arrangement of the elongated body 10, cone support bail 19, and cone locking bail 30 provides a combination which will retain traffic cones or pylons securely in position on cone support bail 19. The arrangement of the components, as particularly illustrated in FIG. 2, presents an assembly and space arrangement which urges the cone locking bail 30 into an up or down position. Cone locking bail 30 tends to be retained adjacent the surface of body 10. When cone locking bail 30 is moved away from body 10, base 33, having a slight deflection or bend at its center portion, contacts plastic tension plate 35 placing cone locking bail 30 in tension. This general arrangement of components causes cone locking bail 30 to increase in tension as it approaches a position normal to the surface of body 10. In moving cone locking bail 30 from the position illustrated in FIGS. 1 and 3, the force required increases as cone locking bail 30 approaches center point or the position normal to body 10. Upon passing over the 90° point, the cone locking bail 30 then is forced toward body 10 in effect moving over a fulcrum point. The deflected portion at the center section of base 33 together with the arrangements of these various components, in combination with a retaining of base 33 against body 10 by "U" bolts 38 and 39, forces connecting collar 34 against plastic tension plate 35 and places base 33 and body 10 in tension causing cone locking bail 30 to move to a position which is parallel to body 10. Other spring loading arrangements may be feasible; however, construction and arrangement as illustrated in the attached drawings are satisfactory.

The design of the device of this invention is intended to facilitate mounting of the traffic cone rack in a wide variety of positions on a vehicle. The flexibility and arrangement of the components permit a bumper mounting as illustrated in FIG. 1, a deck or floor mounting as illustrated in FIG. 3, and a wall panel as well as deck or floor mounting as illustrated in FIG. 4. In attaching the device of this invention in a bumper mount configuration as illustrated in FIG. 1, four holes must be drilled in the bumper. The device is held in the desired mounting position and holes corresponding to first adapter plate hole 15 and second adapter plate hole 16 drilled in the bumper. In a similar fashion, a hole corresponding to first row mounting hole 13 and second row mounting hole 14 is drilled in the bumper and bolts inserted and nuts attached and tightened to secure the device firmly in position on the bumper as illustrated in FIG. 1. In the case of a desired mounting on a deck or floor, the adapter plate 12 is bolted to the elongated body 10 in the configuration substantially as illustrated in FIG. 3. Holes are drilled in the floor or deck to correspond with the holes in body end projection 11 and first row mounting holes 13 and second row mounting holes 14 screws or nuts are secured through the floor or deck as illustrated in FIG. 3, firmly mounting the device to the floor or deck. If a mounting on the floor or wall panel in the configuration illustrated in FIG. 4 is desired, a series of small holes are drilled corresponding to the ends of the "U" bolts retaining cone support bail 19 to the body 10 and cone locking bail 30 to body 10. Securing nuts on the "U" bolts are removed and the "U" bolts projected through the floor or wall panel and the nuts retightened. This configuration results in a very sturdy construction having a configuration as substantially illustrated in FIG. 4. Modification of mounting methods are feasible. However, the foregoing illustrated methods have proved highly satisfactory.

The device of this invention inherently has particular advantages in two areas. One is the convenience and orderly method of mounting and transporting the traffic cones; however, a second important advantage is in the auxiliary or adjunct feature of warning the operator of the vehicle that the cone locking bail 30 is in the open position when the ignition switch of the vehicle is activated and the cone locking bail 30 is not in the down or locked position. This not only assists in preventing the loss of traffic cones or pylons, but reminds the operator of the vehicle to make his safety walk around the vehicle to insure the loading of the vehicle and that no pets or children are adjacent the vehicle.

The device of this invention has been described in detail as to method of construction assembly as well as operation and use. One well versed in the art can undoubtedly, from a study of the detailed description and various views, visualize other adaptations and modifications. What is desired to be claimed are all embodiments of this device not departing from the scope of equivalents of the device of this invention as defined in the appended claims.

I claim:

1. A traffic cone rack for storing and transporting traffic cones comprising:
   a. an elongated body member adapted to be secured to a vehicle,
   b. means to secure said body member to a portion of the vehicle,
   c. a cone support bail secured to said body member for supporting traffic cones positioned thereon, said cone support bail comprising base arms projecting parallel to said body member and attached to same, a bail base projecting outward from said base arms, and a cone support bail projecting upward from said bail base, said base arms, bail base, and cone support bail forming an integral unit, and
   d. a cone locking bail tiltably mounted on an upper end of said body member for securing in place traffic cones positioned on said cone support bail, said cone locking bail comprising a base tiltably secured to said body member, arms projecting from said base, said arms and said base forming an integral unit, a connecting collar secured at the center of said base, and a plastic tension plate mounted intermediate said connecting collar and said body member, said base, connecting collar, and plastic tension plate forming a spring loading arrangement for maintaining a position of said cone locking bail relative to said cone support bail.

2. The traffic cone rack of claim 1 wherein said means to secure said body member to a vehicle is an adapter plate having holes in an end thereof to secure said adapter plate to an end projection of said body member and mount holes in a second end to secure said traffic cone rack to a vehicle.

3. The traffic cone rack of claim 2 wherein said means to secure said cone support bail and said cone locking bail to said body member are U-bolts.

4. The traffic cone rack of claim 3 wherein said base and said arms of said cone locking bail form a V-configuration.

5. The traffic cone rack of claim 4 wherein said end base of said cone locking bail has a slight downward deflection at its center that coacts with said plastic tension plate to create tension on said cone locking bail.

* * * * *